(12) United States Patent
Nagarajan et al.

(10) Patent No.: US 6,422,869 B1
(45) Date of Patent: Jul. 23, 2002

(54) METHODS AND APPARATUS FOR ASSESSING AND IMPROVING PROCESSING OF TEMPORAL INFORMATION IN HUMAN

(75) Inventors: Srikantan Nagarajan; Michael M. Merzenich; David T. Blake, all of San Francisco, CA (US); Beverly A. Wright, Evanston, IL (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 08/970,564

(22) Filed: Nov. 14, 1997

(51) Int. Cl.$^7$ .............................................. G09B 19/00
(52) U.S. Cl. ..................... 434/156; 434/236
(58) Field of Search ................. 434/156, 161, 434/169, 236; 600/553, 558, 559, 587, 27

(56) References Cited

U.S. PATENT DOCUMENTS

| | | | |
|---|---|---|---|
| 4,889,422 A | * 12/1989 | Pavidis | 600/558 X |
| 4,892,106 A | * 1/1990 | Gleeson, III | 600/558 X |
| 5,195,532 A | * 3/1993 | Schumacher et al. | 600/553 |
| 5,349,955 A | * 9/1994 | Suzuki et al. | 600/558 |
| 5,368,308 A | * 11/1994 | Darnell | 434/169 X |
| 5,387,104 A | * 2/1995 | Corder | 434/169 X |
| 5,395,301 A | * 3/1995 | Russek | 600/27 X |
| 5,599,274 A | * 2/1997 | Widjaja et al. | 600/27 |
| 5,735,693 A | * 4/1998 | Groiss | 434/169 X |
| 5,920,374 A | * 7/1999 | Vaphaides et al. | 600/558 |
| 6,019,607 A | * 2/2000 | Jenkins et al. | 434/169 X |

FOREIGN PATENT DOCUMENTS

| | | |
|---|---|---|
| DE | 43 18 336 C | 6/1994 |
| EP | 0 766 218 A1 | 4/1997 |
| GB | 2 311 888 A | 10/1997 |

OTHER PUBLICATIONS

Nagarajan et al., "Practice–Related Improvements in Somatosensory Interval Discrimination Are Temporally Specific But Generalize Across Skin Location, Hemisphere, and Modality," Feb. 15, 1998, The Journal of Neuroscience, pp. 1559–1570.

Merzenich et al., "Temporal Processing Deficits of Language–Learning Impaired Children Ameliorated by Training," Jan. 5, 1996, Science vol. 271, pp. 77–81.

Wright et al., "Learning and generalization of Auditory Temporal–Interval discrimination in Humans", Journal of Neuroscience, May 15, 1997, pp. 3956–3963.

International Search Report, PCT/US98/23748, Dated Apr. 13, 1999, European Patent Office.

* cited by examiner

Primary Examiner—Sam Rimell
(74) Attorney, Agent, or Firm—Beyer Weaver & Thomas LLP

(57) ABSTRACT

A computer-implemented method for improving temporal processing of a first type of information in human is disclosed. The first type of information pertains to one of touch, auditory, and visual. The computer-implemented method includes providing a computer, and providing a stimuli generator coupled to the computer. The stimuli generator providing, responsive to control signals from the computer, first stimuli, the first stimuli being a different one of the touch, auditory, and visual. The computer-implemented method further includes applying the first stimuli from the stimuli generator to the human. The first stimuli are produced around a plurality of time scales to facilitate improvement in the temporal processing of the first type of information around the plurality of time scales.

26 Claims, 5 Drawing Sheets

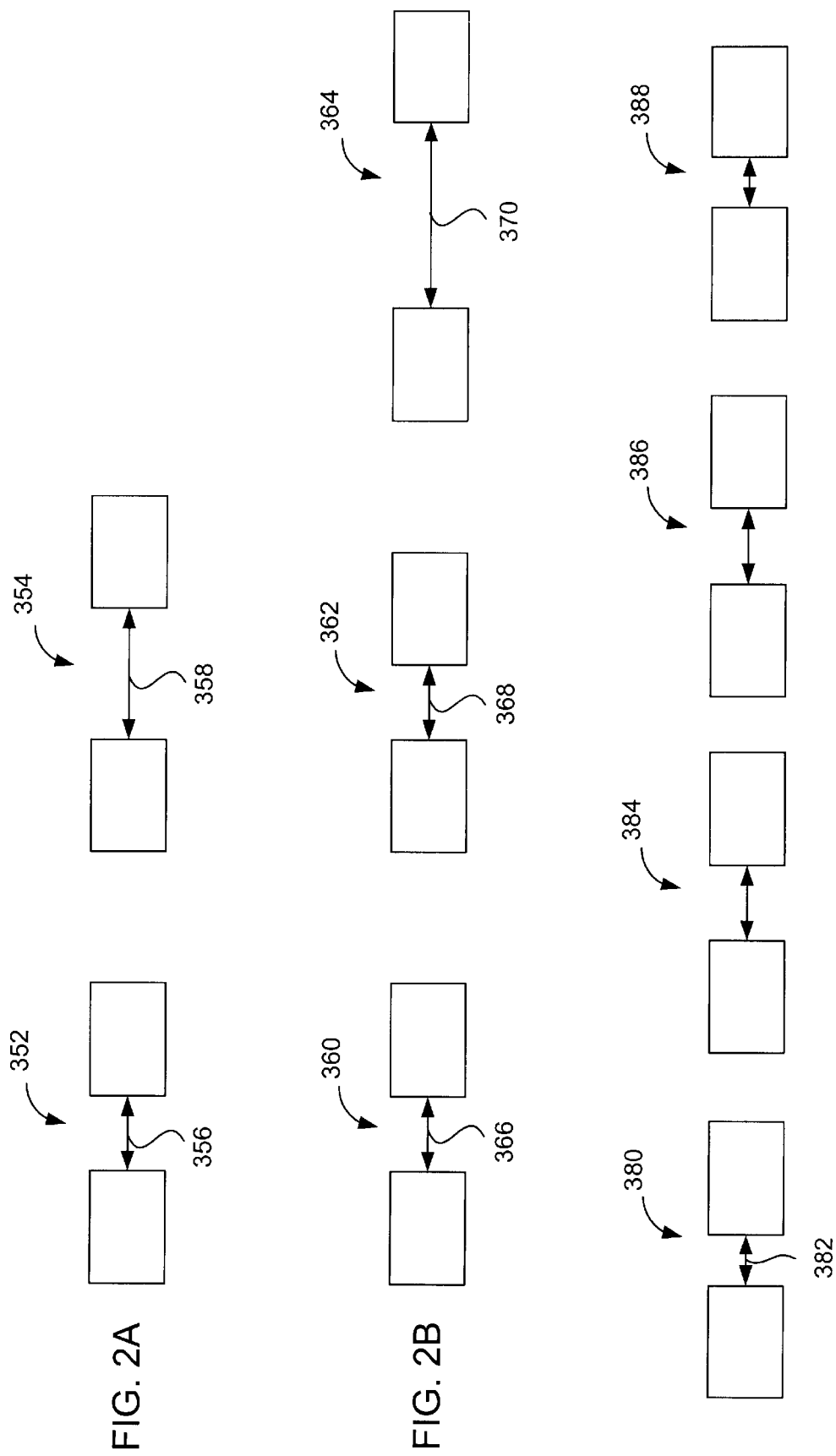

METHODS AND APPARATUS FOR ASSESSING AND IMPROVING PROCESSING OF TEMPORAL INFORMATION IN HUMAN

BACKGROUND OF THE INVENTION

The present invention relates generally to techniques for assessing and improving processing of temporal information in people. More particularly, the present invention relates to improved techniques for training people to improve reading and/or language skills.

Temporal processing relates to the ability of a person to process time-varying information. Speech is an example of temporal information since the information in speech is conveyed via time-varying sound waves to be received by the listener though the auditory sense. In people, it has been found that the ability to properly process temporal information is crucial to the development of many important skills such as speech, language, learning, and the like.

Although there exist many different theories about how the brain receives and processes information, one popular theory suggests that in the adult human, the brain is essentially hard-wired and little, if any, improvement could be achieved by training the brain in certain basic tasks, e.g., training the brain to process temporal information at an improved rate and/or accuracy. In accordance with this theory, temporal processing cannot be learned or improved through training.

On the one hand, there is little information in the art on the theoretical underpinnings pertaining to improvement of temporal processing through training. On the other hand, there is also little discussion in the art pertaining to how training may be structured to achieve improvement in temporal processing. In particular, little has been discussed by way of tailoring temporal processing training to achieve improvement in a specific area, e.g., in the processing of auditory information as it relates speech processing. By way of example, although a person may be deficient in general in the processing of a certain type of temporal information, e.g., auditory information, it is known that the time scale pertaining to speech or language processing is fairly narrow, e.g., between about 0 millisecond and 1000 milliseconds. Yet, there is no discussion in the art on how temporal processing training may be tailored specifically to maximize improvement in the processing of speech and language (if improvement in speech processing is desired).

As another example, although the processing of speech and language relates to the auditory sense, temporal data in the time scale relevant for speech processing may be received by a human via many different modalities (i.e., through the different senses such as touch, visual, haptic, or the like). Yet there is no discussion in the art on whether modalities other than auditory may be employed to advantage in temporal processing training to improve speech development. Generally, little information exists on whether training in one or more modalities may lead to improvement in other modalities.

SUMMARY OF THE INVENTION

The invention relates, in one embodiment, to a computer-implemented method for improving temporal processing of a first type of information in human. The first type of information pertains to one of touch, auditory, and visual. The computer-implemented method includes providing a computer, and providing a stimuli generator coupled to the computer. The stimuli generator providing, responsive to control signals from the computer, first stimuli, the first stimuli being a different one of the touch, auditory, and visual. The computer-implemented method further includes applying the first stimuli from the stimuli generator to the human. The first stimuli are produced around a plurality of time scales to facilitate improvement in the temporal processing of the first type of information around the plurality of time scales.

In another embodiment, the invention relates to a computer-implemented method for improving temporal processing of auditory information in human. The method includes providing a computer, and providing a stimuli generator coupled to the computer. The stimuli generator providing, responsive to control signals from the computer, touch stimuli. The method further includes applying the touch stimuli from the stimuli generator to the human. The touch stimuli are produced around a plurality of time scales to facilitate improvement in the temporal processing of the auditory information around the plurality of time scales.

In yet another embodiment, the invention relates to a computer readable medium containing computer readable instructions for facilitating improvement of temporal processing of auditory information in human. The computer-readable medium includes computer readable instructions for iteratively administering a touch test to the human, which include computer readable instructions for generating, using a stimuli generator coupled to a computer, touch stimuli. The touch stimuli are configured to be applied to the human and produced around a plurality of time scales to facilitate improvement in the temporal processing of the auditory information around the plurality of time scales. There are further included computer readable instructions for receiving at the computer a response to the touch stimuli from the human; and computer readable instructions for evaluating whether the response is accurate.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings in which like reference numbers refer to like items and in which:

FIG. 2A depicts the two-alternative-forced-choice test format.

FIG. 2B depicts the match-to-sample test format.

FIG. 2C depicts the limited-hold-reaction-time test format.

DETAILED DESCRIPTION OF THE PREFERRED EMBODIMENTS

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

In accordance with one aspect of the present invention, there is disclosed an improved technique for improving temporal processing in people via cross-training using different modalities. In one embodiment, temporal processing in one modality is improved by training the target human in the same modality or in one or more different modalities. Preferably the training employs stimuli within the time scale of interest to a specific skill to maximize the desired improvement in that specific skill. Also, the training preferably employs stimuli at different time base lines within the time scale of interest to ensure improvement throughout the time scale of interest.

In accordance with another aspect of the present invention, there is disclosed a computer-implemented technique for improving temporal processing in human beings. In one embodiment, a computer-controlled transducer (such as a probe) is employed to deliver computer-controlled stimuli to train the test subject. The computer-controlled stimuli preferably have substantially the same intensity, duration, and spatial parameters so that time can be isolated as the varying component for training. Preferably the computer-controlled stimuli are organized within the time scale of interest to maximize the desired improvement in a specific skill. Also, the transducer is preferably controlled by the computer to produce the stimuli at different time base lines within the time scale of interest to ensure improvement throughout the time scale of interest.

Figure 1A:
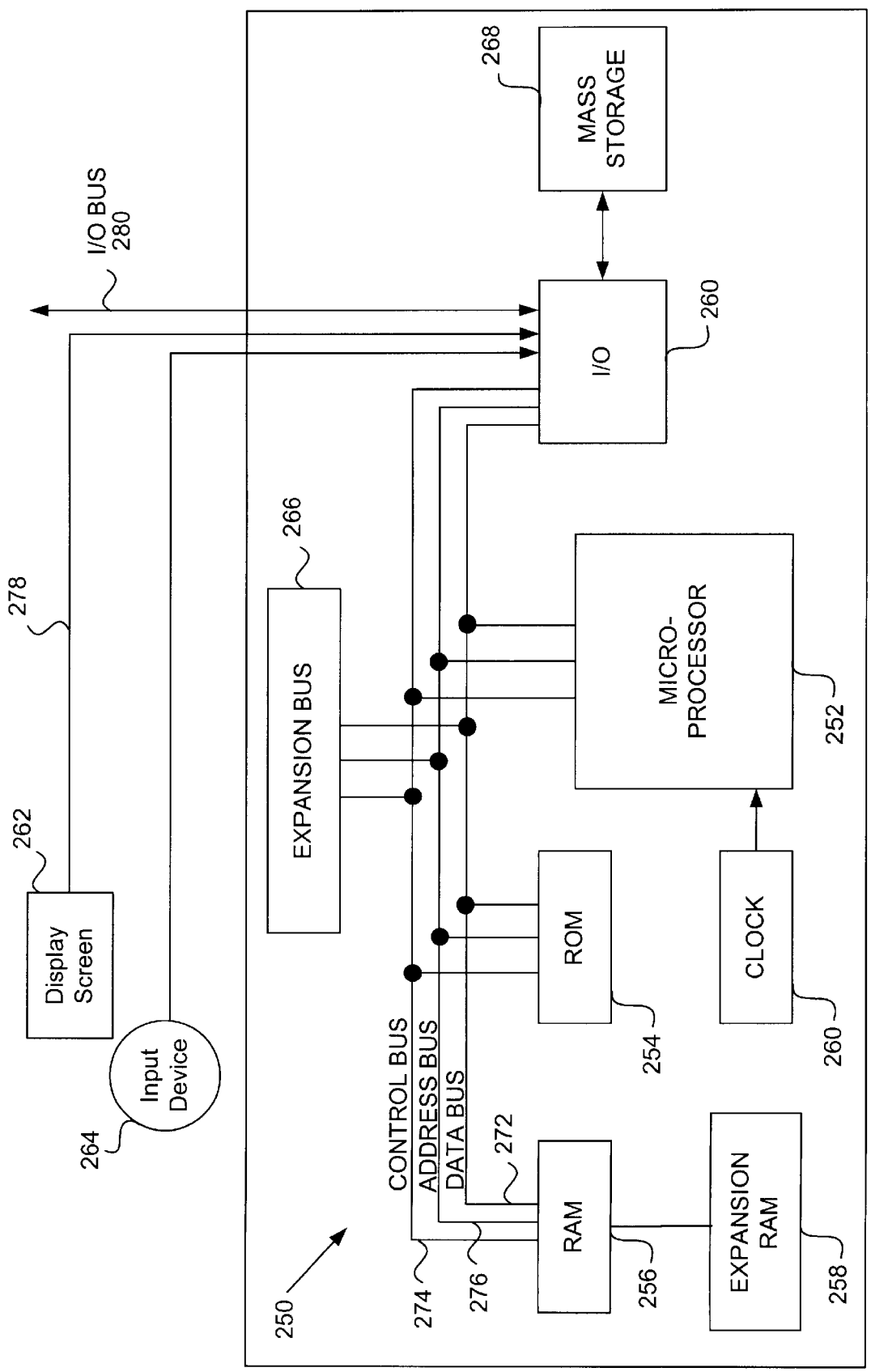
FIGS. 1A and 1B illustrate, in accordance with one embodiment of the invention, the computer-controlled apparatus for delivering computer-controlled stimuli to the test subject for assessing and/or improving temporal processing.
Figure 1B:
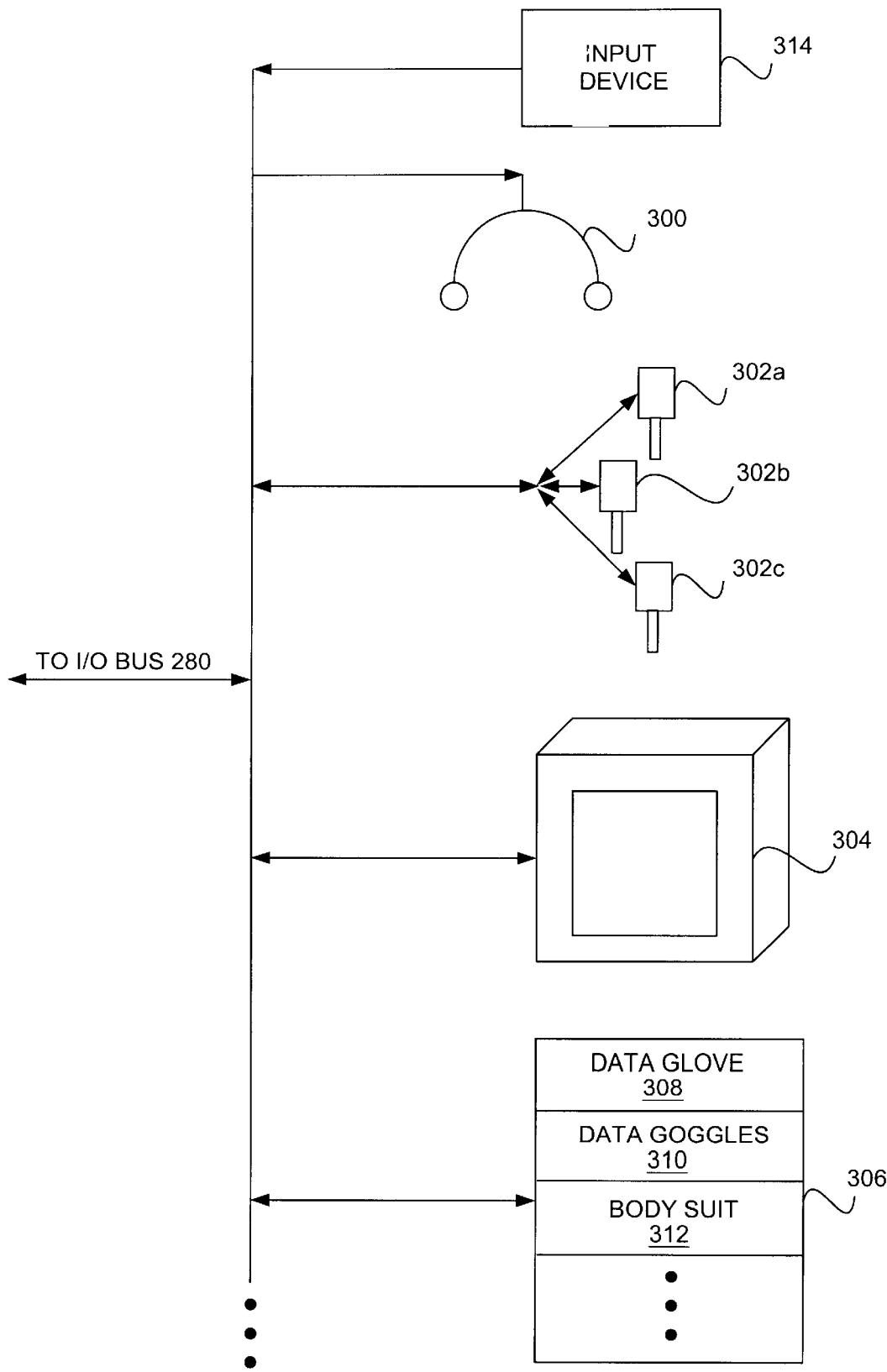

The features and advantages of these aspects of the invention, as well as other aspects of the present invention, may be better understood with reference to the figures and discussions that follow. FIGS. 1A and 1B illustrate, in accordance with one embodiment of the invention, an exemplary computer-controlled apparatus, including computer 250, for delivering computer-controlled stimuli to the test subject for assessing and/or improving temporal processing. As the terms are employed herein, assessment refers generally to ascertaining a test subject's discrimination threshold while training refers generally to improving the test subject's discrimination threshold, thereby also improving the test subject's temporal processing. Note that either assessment or training may be accomplished using the techniques and stimuli disclosed herein.

Referring to FIG. 1A, a computer system 250 in accordance with the present invention includes a central processing unit (CPU) 252, read only memory (ROM) 254, random access memory (RAM) 256, expansion RAM 258, input/output (I/O) circuitry 260, display assembly 262, input device 264, and expansion bus 266. Computer system 250 may also optionally include a mass storage unit 268 such as a disk drive unit or nonvolatile memory such as flash memory and a real-time clock 260. In one embodiment, mass storage unit 268 may include units which utilizes removable computer readable media, such as floppy disks, opto-magnetic media, optical media, and the like for the storage of programs and data.

CPU 252 is preferably a commercially available, single chip microprocessor such as one of the Intel X86 (including Pentium™) or Motorola 680XX family of chips, a reduced instruction set computer (RISC) chip such as the PowerPC™ microprocessor available from Motorola, Inc, or any other suitable processor. CPU 252 is coupled to ROM 254 by a data bus 272, control bus 274, and address bus 276. ROM 254 may partially contain the basic operating system for the computer system 250. CPU 252 is also connected to RAM 256 by busses 272, 274, and 276 to permit the use of RAM 256 as scratch pad memory. Expansion RAM 258 is optionally coupled to RAM 256 for use by CPU 252. CPU 252 is also coupled to the I/O circuitry 260 by data bus 272, control bus 274, and address bus 276 to permit data transfers with peripheral devices.

I/O circuitry 260 typically includes a number of latches, registers and direct memory access (DMA) controllers. The purpose of I/O circuitry 260 is to provide an interface between CPU 252 and such peripheral devices as display assembly 262, input device 264, mass storage 268, and/or any other I/O devices. I/O circuitry 260 may also include analog-to-digital (A/D) converters, digital-to-analog (D/A) converters, as well as other control circuits for controlling and receiving feedback data from the I/O devices. The I/O devices suitable for generating stimuli to be administered to the test subject and for receiving responses therefrom may be coupled to I/O bus 280 of computer 250. They are discussed in greater detail with reference to FIG. 1B. Display assembly 262 of computer system 250 is an output device for displaying objects and other visual representations of data, as well as for generating visual stimuli in one embodiment.

The screen for display assembly 262 can be a device that uses a cathode ray tube (CRT), liquid crystal display (LCD), or the like, of the types commercially available from a variety of manufacturers. Input device 264 can be a keyboard, a mouse, a stylus working in cooperation with a position-sensing display, or the like. Alternatively, input device 264 can be an embedded RF digitizer activated by an "active" RF stylus. As a further alternative, input device 264 may be any type of switch capable of communicating a test subject's response to computer system 250. Therefore, as used herein, the term input device will refer to any mechanism or device for entering data and/or pointing to a particular location on a screen of a computer display. One or more input devices may be provided to control computer 250 and/or to receive responses from the test subject. The aforementioned input devices are available from a variety of vendors and are well known in the art.

Some type of mass storage 268 is generally considered desirable. However, mass storage 268 can be eliminated by providing a sufficient amount of RAM 256 and expansion RAM 258 to store user application programs and data. In that case, RAMs 256 and 258 can optionally be provided with a backup battery to prevent the loss of data even when computer system 250 is turned off. However, it is generally desirable to have some type of long term mass storage 268 such as a commercially available hard disk drive, nonvolatile memory such as flash memory, battery backed RAM, PC-data cards, or the like.

In FIG. 1B, some exemplary stimuli generators are shown, including headphone 300 (for delivering auditory stimuli), computer-controlled probe 302 (for delivering touch stimuli), visual stimuli generator 304 (for delivering visual stimuli), and/or virtual reality apparatus 306 (for delivering stimuli to and receiving responses from the test subject in a virtual manner through any of the senses). In general, these I/O devices may interface with computer system 250 via I/O circuit 260 or an appropriate interface circuit, which may be external to computer 250 and/or dedicated to the I/O device. Visual stimuli generator 304 may represent, for example, any light generating device such as a light bulb, a flash device, another computer display screen or the like if such is employed instead of display screen 262 of computer 250 for providing visual stimuli to the test subject. Virtual reality apparatus 306 may include, for example data glove 308, virtual goggles 310, body suit 312, or the like, each of which may be able to both deliver the stimuli to the test subject as well as sense the responses therefrom. An optional input device 314 is also shown, representing a dedicated input device, such as a switch, for receiving responses from the test subject. Optional input device 314 is provided when it is desired to receive responses to the test stimuli from the test subject through an input device other than input device 264 of computer 250.

In operation, computer system 250 is employed to generate control signals to the stimuli generator(s) to produce the stimuli of the various tests. These stimuli are then furnished to the test subject for assessment and/or training, and the responses from the test subject may then be recorded by input device 264 and/or input device 314 and analyzed by CPU 252. If desired, feedback to the test subject may be given at various stages of the test(s) via, for example, display assembly 262.

It should be borne in mind that although computer system 250 is discussed in some detail herein to facilitate discussion, the invention may be practiced using a variety of suitable computer-implemented technique. In general, any suitable computer system may be employed for generating control signals to the stimuli generators and receive feedback from the input device(s). Further, the inventive training technique disclosed herein may be implemented via a computer network, such as a local area network (LAN), wide area network (WAN) or a global computer network such as the Internet. In the latter cases, the inventive computer-implemented assessment and/or training technique may be implemented at least in part as downloadable computer software and data (e.g., applets such as JAVA™ applets from Sun Microsystems Inc.). The downloadable computer software and data may be kept on one or more servers on the network, accessible by any client computer or terminal capable and authorized for such access. The client computer/terminal may then be employed to control an appropriate stimuli generator and to gather responses from the test subject. To facilitate testing, the downloadable computer software and data can be downloaded once and reused over and over at the client computer/terminal. Alternatively, the downloadable computer software and data can be downloaded for each individual testing session via the network as needed. In some cases, the computer software may be executed at the servers themselves, with program outputs transmitted to the client computer/terminal for interfacing with the I/O devices. Network computing techniques and implementations therefor are well known in the art and are not discussed in great detail here for brevity's sake.

In accordance with one aspect of the present invention, a computer-controlled probe, such as probe 302 of FIG. 1B, is employed to assess how touch stimuli may be utilized in improving a test subject's temporal processing of auditory information. To isolate the temporal component from other components of the touch stimuli, e.g., the intensity or spatial components, the probe is preferably controlled to deliver the same amount of force at the same location on the test subject's body each time. Such a probe may employ a conventional actuator, which drives a probe at a certain time with a certain amount of force for a certain duration responsive to either analog or digital control signals. As shown in FIG. 1B, one or multiple probes 302 may be provided to deliver simple stimuli patterns or complex, multi-site stimuli patterns to the test subject.

The computer-controlled probe may be programmed to deliver the touch stimuli in a two-alternative-forced-choice test format although any other test format may be employed. FIGS. 2A–2C illustrate some exemplary test formats with which the stimuli may be delivered to the test subject. It should be noted that the test formats of FIGS. 2A–2C are illustrative only, and any test format designed to assess and/or train a test subject's temporal discrimination threshold may be employed. For example, the stimuli for assessment and/or training may have varying force, spatial locations (e.g., where they are delivered on the test subject's skin), duration, amplitude, frequency, and/or delay (between stimuli)). Further, complex and/or multi-site stimulus patterns may also be employed. The stimuli in these complex and/or multi-site stimulus patterns may involve the same or different ones of the above parameters. These parameters may be furnished to, for example, probe 302 or virtual reality apparatus 306 of FIG. 3 to deliver the desired stimuli or stimulus patterns to the test subject.

The two-alternative-forced-choice test format is illustrated in FIG. 2A. In FIG. 2A, the touch stimuli are delivered in two pairs: a standard stimuli test pair 352 and a target stimuli test pair 354. The stimuli in each of stimuli pairs 352 and 354 are separated by respective inter-stimulus intervals (ISI) 356 and 358. Upon receiving the stimuli pairs, the test subject is asked to determine which of ISI's 356 and 358 is longer and to respond with the answer.

The touch stimuli may also be delivered via a match-to-sample test format. As shown in FIG. 2B, the match-to-sample test format involves a standard stimuli test pair (shown to be stimuli pair 360 in FIG. 2B). A plurality of target stimuli test pairs are also furnished, of which two target stimuli test pairs 362 and 364 are shown. Of course, the standard stimuli test pair does not have to be the first stimuli pair presented, and any number of target stimuli test pairs may be furnished. The stimuli in the standard stimuli test pair are separated by a standard inter-stimulus interval (depicted by reference number 366). The stimuli in target stimuli test pairs are also separated by inter-stimulus intervals 368 and 370 as shown. Upon receiving the stimuli pairs, the test subject is asked to determine which target stimuli pair has the same inter-stimulus interval (ISI) as that of standard stimuli test pair 360 and to respond with the answer.

The limited-hold-reaction-time test represents another test format with which the touch stimuli may be delivered to the test subject. As shown in FIG. 2C, the limited-hold-reaction-time test format involves a standard stimuli test pair (shown to be stimuli pair 380 in FIG. 2C), typically representing the first stimuli pair furnished to the test subject. The stimuli in standard stimuli test pair 380 are separated by a standard inter-stimulus interval (depicted by reference number 382). Target stimuli test pairs are then delivered one by one to the test subject. Each of these target stimuli test pairs has their stimuli separated in time by an inter-stimulus interval. By way of example, three target stimuli test pairs 384, 386, and 388 are shown. As each target stimuli test pair is received, the test subject is asked to determine whether that target stimuli test pair has the same inter-stimulus interval (ISI) as that of standard stimuli test pair 380. By way of example, the test subject may be requested to activate a switch upon determining that the recently received target stimuli pair has the same ISI as that of the standard stimuli test pair.

In one experiment, the computer-controlled touch stimuli are delivered to one finger of one hand of the test subjects. The test subjects are given feedback on their responses and are trained over a period of two weeks. For this experiment, the ISI time scale is chosen to be within the perceptual time scale, e.g., between about 0 milliseconds and about 1000 milliseconds. Within this time scale, the ISIs are centered around different time base lines. By way of example, the stimuli pairs may be formed such that their ISIs are centered around the 100 milliseconds base line. Using the two-alternative-forced-choice test format to illustrate, the standard stimuli test pair may have, for example, a 90 milliseconds ISI and the target stimuli pair may have, for example, a 110 milliseconds ISI. If the stimuli pairs are formed such that their ISIs are centered around the 300 milliseconds base line, the standard stimuli test pair may have, for example, a 310 milliseconds ISI and the other stimuli pair may have, for example, 330 milliseconds ISI.

After two weeks, it is discovered that such training indeed improves the ability of the test subject to discriminate between different ISI's. By way of example, a normal person may be able to, for example, discriminate between an ISI of 100 milliseconds and an ISI of 110 milliseconds with 30% accuracy prior to training. After two weeks of training, the same person may be able to, for example, discriminate between an ISI of 100 milliseconds and an ISI of 110 milliseconds with up to 80% accuracy. It is discovered also that the improvement tends to be more dramatic for those who have poor temporal discrimination skills prior to training than for those who already possess advanced temporal processing skills.

The experiment shows that temporal processing skills may be assessed and trained. Further, the touch stimuli tests applied to adjacent fingers or to the same finger on the other hand of the test subjects reveal that the improvement can be generalized to different areas of the body. This is a significant finding since it confirms that such training improves the ability of the brain to process temporal information and such improvement is retained even if the site through which the touch stimuli is received changes.

It is found, however, that the improvement tends to be limited around the base line trained. In other words, the improvement in temporal processing significantly attenuates at base lines other than the base line trained. For example, it is observed that a test subject trained with ISI's centered only around the 100 milliseconds base line tends to have pronounced improvement in processing temporal information around the 100 milliseconds time scale. The degree of improvement tends to attenuate or decrease if the test subject is asked to process temporal information centered around a different time scale, say 800 milliseconds. In fact, it has been found that the improvement gradually diminishes in direct relation to the difference in time scales (from the time scale trained). Improvement tends to diminish substantially if the difference in time scales (from the time scale trained) is greater than about 100 milliseconds.

A useful conclusion can be drawn from the above finding. Although temporal processing can be improved with training, the improvement is not generalized across all base lines. Accordingly, training needs to be done at all base lines of potential interest. Preferably but not necessarily, the base lines trained may be spaced 100 milliseconds apart to ensure that improvement is achieved throughout the relevant time scale.

Another useful conclusion may also be drawn from the above finding. To maximize the improvement in a particular temporal processing skill through training, it is important to identify the time scale for training. Since most temporal processing skills are centered around a particular time scale (e.g., the skills involved in language learning and reading tend to be centered around the perceptual time scale, which spans from about 0 millisecond to about 1000 milliseconds) and since improvement in temporal processing is not generalized across time scales, it is not efficient to train at base lines other than the base lines within the relevant time scale. For example, training a test subject at the 2,000 milliseconds base line tends to have little impact on that test subject's perceptual processing skills than training at, for example, base lines between about 100 milliseconds and 500 milliseconds. By properly identifying the relevant time scale relevant to a particular temporal processing task, training may be efficiently tailored around appropriate base lines within the identified time scale.

Surprisingly, it has been found that when temporal processing is improved through training in one of the senses, the improvement is retained even if the temporal data is subsequently received through senses other than the sense with which the test subject is trained. For example, when a test subject is trained in the sense of touch (using, for example, the aforementioned computer-controlled probe) such that the test subject's temporal processing ability is improved when different touch stimuli are received, it is discovered that the test subject's ability to process temporal information received through another sense (e.g., the auditory sense) also improves after training. In other words, when different tonal stimuli around the time scale trained are heard by the test subject after training with touch stimuli, that test subject surprisingly also shows improvement in processing the received temporal auditory information.

One useful conclusion that may be drawn from the foregoing relates to cross-training. Since training in one of the senses appears to improve the ability of the brain to process subsequently received temporal information in the time scale trained even if the subsequently received temporal information is received through a different sense, this fact suggests that temporal processing training may be done through different modalities, i.e., utilizing different senses. By way of example, a test subject's temporal processing of auditory information may be improved by training the test subject not only through the auditory sense but also through the touch, haptic, visual, and/or other senses. Since training in one of the senses improves the ability of the brain to process temporal information received through other senses, it is of course possible to improve auditory temporal processing even without involving the auditory sense during training. Indeed, any of the senses may be improved by training in the same and/or different modalities. It should be appreciated that the ability to integrate a number of modalities (i.e. senses) into the assessment and/or training program greatly improves the flexibility of the assessment and/or training program.

Figure 3:
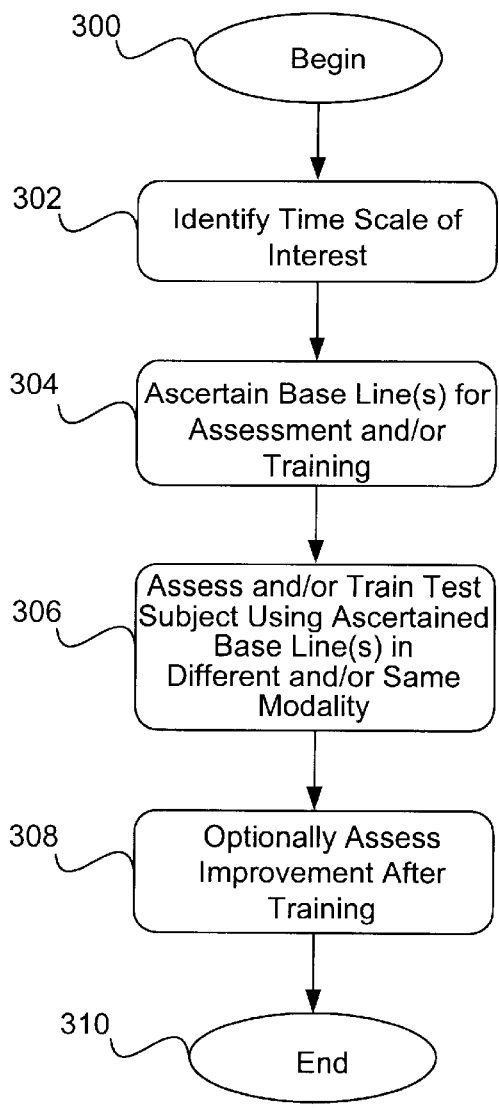
FIG. 3 is a flowchart depicting, in accordance with one embodiment of the present invention, the inventive technique for assessing and improving temporal processing in humans.

FIG. 3 is a flowchart depicting, in accordance with one embodiment of the present invention, the inventive technique for assessing and improving temporal processing in humans. In step 302, the time scale of interest to the skill to be improved is identified. In general, the time scale of interest may be empirically determined beforehand. As mentioned earlier, it has been found that improvement in temporal processing tends to be localized around the time scale trained. Accordingly, it is advantageous to identify the time scale of interest to maximize training efficiency.

Different time scales are relevant to different skills. As mentioned, the time scale relevant to perceptual processing (e.g., to improve speech or language skills) is approximately between 0 millisecond and 1000 milliseconds, or more typically between 10 milliseconds and 500 milliseconds. The time scale relevant to working memory is, for example, approximately between 1 to 10 seconds. Other skills, e.g., those involving other forms of cogintion and/or memory, may operate on different time scales.

In step 304, the base line(s) for assessment and/or training is ascertained. The base lines represent the time values around which the pairs of stimuli may be formed. By way of example, training to improve speech and/or language skills may involve different base lines (e.g. 100 milliseconds, 200 milliseconds, and so on) within the perceptual processing time scale. Set of stimuli pairs are then formed around each base line to train the test subject at that particular base line.

In step 396, the test subject is then trained using stimuli pairs formed around the base line(s) ascertained in step 394. The stimuli pairs employed for testing and/or assessment may be in any test format, including those discussed in connection with FIGS. 2A–2C. Further, the stimuli pairs may be furnished to the test subject through either the sense to be improved (e.g., through the auditory sense if language skill is sought to be improved) or through one or more different senses. Step 394 and 396 may be repeated as many times as desired. Alternatively, all the base lines may be identified in advance in step 394 and then employed to form the stimuli for assessment and/or training in step 396. In step 398, the stimuli pairs may be employed to optionally assess the improvement within the time scale of interest. Improvement assessment, which involves furnishing the stimuli pairs around different base lines, recording and analyzing the responses for improvement, may be undertaken to allow the test administrator to gauge a test subject's susceptibility to training and/or his training progress.

Figure 4:
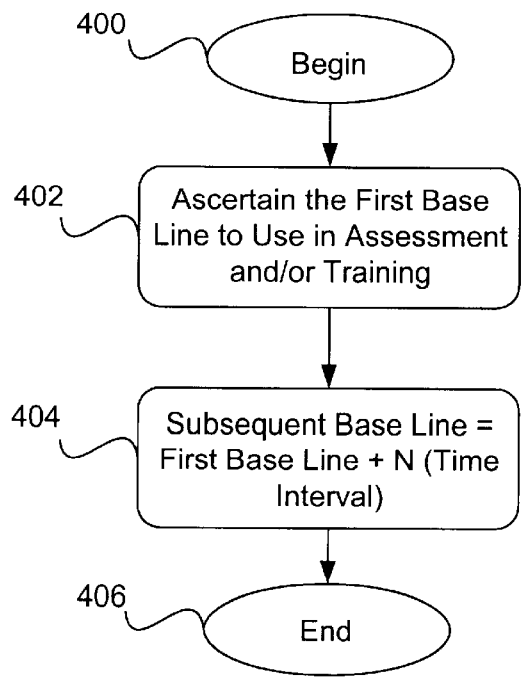
FIG. 4 depicts, in accordance with one aspect of the present invention, the steps involved in methodically ascertaining the base line(s) for training.

With reference to step 394 of FIG. 3, which ascertains the base line(s) for assessment and/or training within the time scale of interest, the base line(s) may be ascertained methodically or randomly. FIG. 4 depicts, in accordance with one aspect of the present invention, the steps involved in methodically ascertaining the base line(s) for training. In step 402, the first base line is ascertained. This base line may represent any arbitrarily chosen time value within the time scale of interest, or it may represent a time value around either the minimum time value or the maximum time value of the time scale of interest. In step 404, subsequent base lines are ascertained by repeatedly adding an interval value to the first base line. The interval value is preferably chosen such that the improvement attributable to each base line overlaps the improvement attributable to its adjacent base line(s). In this manner, improvement may be achieved throughout the time scale of interest even though the improvement attributable to each base line is not generalized across all base lines. In one example, an interval value of between about 50 milliseconds and about 100 milliseconds works well for speech/language skills training.

The base line(s) for assessment and/or training may also be randomly generated. To facilitate efficient assessment and/or training, the randomly generated base lines are preferably confined within the time scale of interest. To ensure that the improvement is achieved throughout the time scale of interest as well as to improve training efficiency, a base line is preferably separated from its previous base line by at least a predefined interval value. As mentioned in connection with FIG. 4, the interval value is preferably chosen such that the improvement attributable to each base line overlaps the improvement attributable to its adjacent base line(s).

Figure 5:
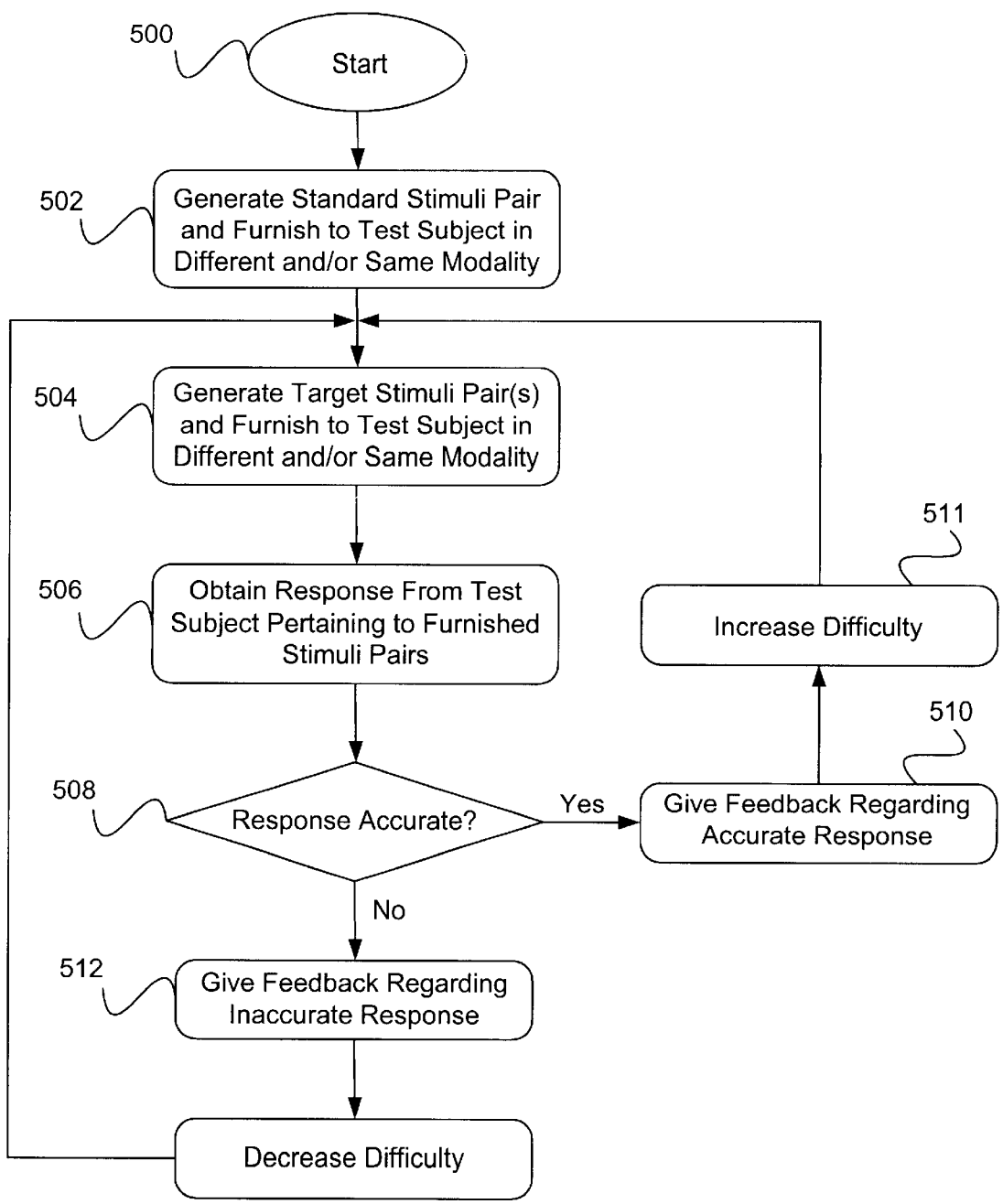
FIG. 5 illustrates in greater detail, in accordance with one embodiment of the invention, the assessing and/or training step of FIG. 3.

FIG. 5 illustrates, in accordance with one embodiment of the invention, step 396 of FIG. 3 (the training step) in greater detail. Referring now to FIG. 5, the standard stimuli pair is generated and furnished to the test subject in step 502. As mentioned, the standard stimuli pair may be furnished through any of the modalities or a combination thereof.

The standard stimuli pair preferably has an inter-stimulus interval (ISI) around the base line employed for training. By way of example, if the base line is 100 milliseconds, the standard stimuli pair may have an ISI of about 100 milliseconds or within the neighborhood of 100 milliseconds (e.g., 80, 90, 110, or 120 milliseconds). The duration and intensity of each stimulus itself may be chosen to be any suitable value for training.

In step 504, the target stimuli pair(s) is generated and furnished to the test subject. Again, the target stimuli pair(s) may be furnished through any of the modalities (although it is preferable that the target stimuli pair(s) is delivered through the same modality as the standard stimuli pair). Note that the exact number of target stimuli pair(s) generated depends on the chosen test format. Initially, the target stimuli pair(s) preferably has an ISI that differs from the ISI of the standard stimuli pair by a time value that is approximately equal or greater than the test subject's discrimination threshold. In one example, the target stimuli pair(s) may have an ISI that differ from the ISI of the standard stimuli pair by about 1–20%, or more preferably by about 1–10%. Preferably, the stimuli generated in step 502 and 504 are of the same intensity and are delivered in the same spatial regime in order to isolate the temporal component for assessment and/or training.

In step 506, the test subject's response to the stimuli pairs furnished in steps 502 and 504 is recorded and analyzed for accuracy as well as any other performance parameters (e.g., the time it takes to come up with the answer, the confidence level, and the like). If the response is correct (ascertained in step 508), the test subject and/or test administrator may be given this feedback in step 510. Thereafter, the difficulty of the test may be increased in step 511 (e.g., by reducing the difference between the ISI of the standard stimuli pair and the ISI of the target stimuli pair(s)), and the test continues.

On the other hand, if the response is incorrect (ascertained in step 508), the test subject and/or test administrator may be given this feedback in step 512. Thereafter, the difficulty of the test may be decreased (e.g., by increasing the different between the ISI of the standard stimuli pair and the ISI of the target stimuli pair(s)) prior to continuing.

While this invention has been described in terms of several preferred embodiments, there are alterations, permutations, and equivalents which fall within the scope of this invention. By way of example, although touch stimuli are discussed throughout the disclosure as the stimuli delivered to the test subject, any other stimuli (e.g., visual, haptic, auditory, and the like) or a combination thereof may be employed to train the test subject. As a further example, although two weeks is mentioned as the training period in one example, the training period may vary from individual to individual, from skill to skill, ranging from days to weeks and even months. Indeed, the stimuli parameters mentioned herein may also be optimized to suit each individual, as individuals differ in their abilities. It is therefore intended that the following appended claims be interpreted as including all such alterations, permutations, and equivalents as fall within the true spirit and scope of the present invention.

What is claimed is:

1. A computer-implemented method for improving temporal processing of a first type of information in a human being, said first type of information pertaining to one of touch, auditory, and visual, said computer-implemented method comprising:

providing a computer;

providing a stimuli generator coupled to said computer, said stimuli generator providing, responsive to control signals from said computer, first stimuli, said first stimuli being one of touch, auditory, and visual; and applying said first stimuli from said stimuli generator to said human, said first stimuli being produced in a range around a plurality of base lines within each of a time scale of interest to thereby facilitating improvement in said temporal processing of said first type of information around said plurality of base lines.

2. The computer-implemented method of claim 1 wherein said plurality of base lines are chosen to be within a perceptual processing time scale.

3. The computer-implemented method of claim 2 wherein said perceptual processing time scale is between about 10 milliseconds and about 500 milliseconds.

4. The computer-implemented method of claim 3 wherein said first type of information is said auditory and said first stimuli is said touch.

5. The computer-implemented method of claim 1 wherein said first stimuli are applied to said human being in a two alternative force choice format.

6. The computer-implemented method of claim 1 wherein said first stimuli are applied to said human being in a match to sample format.

7. The computer-implemented method of claim 1 wherein said first stimuli are applied to said human being in a limited hold reaction time format.

8. The computer-implemented method of claim 1 wherein individual stimulus of said first stimuli has substantially the same intensity and spatial parameters.

9. A computer-implemented method for improving temporal processing of auditory information in a human being, comprising:

providing a computer;

providing a stimuli generator coupled to said computer, said stimuli generator providing, responsive to control signals from said computer, touch stimuli; and applying said touch stimuli from said stimuli generator to said human, said touch stimuli being produced in a range around each of a plurality of base lines within a time scale of interest thereby facilitating improvement in said temporal processing of said auditory information around said plurality of base lines.

10. The computer-implemented method of claim 9 wherein said plurality of base lines are chosen to be within a perceptual processing time scale.

11. The computer-implemented method of claim 10 wherein said perceptual processing time scale is between about 10 milliseconds and about 500 milliseconds.

12. The computer-implemented method of claim 9 wherein said touch stimuli are applied to said human being in a two alternative force choice format.

13. The computer-implemented method of claim 9 wherein said touch stimuli are applied to said human being in a match to sample format.

14. The computer-implemented method of claim 9 wherein said touch stimuli are applied to said human being in a limited hold reaction time format.

15. The computer-implemented method of claim 9 wherein individual stimulus of said touch stimuli has substantially the same intensity and spatial parameters.

16. A computer readable medium containing computer readable instructions for facilitating-improvement of temporal processing of auditory information in a human being, comprising:

computer readable instructions for iteratively administering a touch test to said human including,
computer readable instructions for generating, using a stimuli generator coupled to a computer, touch stimuli, said touch stimuli configured to be applied to said human, said touch stimuli being produced in a range around each of a plurality of base lines within a time scale of interest thereby facilitating improvement in said temporal processing of said auditory information around said plurality of base lines.

computer readable instructions for receiving at said computer a response to said touch stimuli from said human; and computer readable instructions for evaluating whether said response is accurate.

17. The computer readable medium of claim 16 wherein said plurality of base lines are chosen to be within a perceptual processing time scale.

18. The computer readable medium of claim 17 wherein said perceptual processing time scale is between about 10 milliseconds and about 500 milliseconds.

19. The computer readable medium of claim 16 wherein individual stimulus of said touch stimuli has substantially the same intensity and spatial parameters.

20. A computer-implemented method for facilitating improvement of temporal processing of auditory information in a human being, comprising:

providing computer readable instructions for administering a touch test to said human including,
providing computer readable instructions for generating, using a stimuli generator coupled to a computer, touch stimuli, said touch stimuli are configured to be applied to said human, said touch stimuli being produced in a range around each of a plurality of base lines within a time scale of interest to thereby facilitating improvement in said temporal processing of said auditory information around said plurality of base lines.

providing computer readable instructions for receiving at said computer a response to said touch stimuli from said human; and providing computer readable instructions for evaluating whether said response is accurate.

21. The computer-implemented method of claim 20 further including sending said computer readable instructions for administering said touch test though a computer network.

22. The computer-implemented method of claim 21 wherein said computer network is the Internet and said sending is performed through a server coupled to said Internet.

23. The computer-implemented method of claim 20 further including receiving said computer readable instructions for administering said touch test though a computer network.

24. The computer-implemented method of claim 23 wherein said computer network is the Internet and said receiving is performed through a Web browser program.

25. The computer-implemented method of claim 20 wherein said plurality of base lines are chosen to be within a time scale of between about 10 milliseconds and about 500 milliseconds.

26. The computer-implemented method of claim 20 wherein said computer readable instructions for generating said touch stimuli includes computer readable instructions for generating individual stimulus of said touch stimuli having substantially the same intensity and spatial parameters.

* * * * *

UNITED STATES PATENT AND TRADEMARK OFFICE
CERTIFICATE OF CORRECTION

PATENT NO.     : 6,422,869 B1
DATED          : July 23, 2002
INVENTOR(S)    : Nagarajan et al.

It is certified that error appears in the above-identified patent and that said Letters Patent is hereby corrected as shown below:

Column 10,
Line 61, after "being" insert -- a different --.
Line 61, after "one of" and before "touch", insert the word -- said --.
Line 64, after "around" and before "a", insert -- each of --.
Line 64, after "within", delete the phrase -- each of --.
Line 65, after the word "interest" and before the word "thereby", delete the word -- to --.

Column 12,
Line 3, after the last word "lines", delete the "." and insert -- ; --.
Line 29, before the word "thereby", delete the word -- to --.
Line 31, after the last word "lines", delete the "." and insert -- ; --.

Signed and Sealed this

Twenty-eighth Day of January, 2003

JAMES E. ROGAN
*Director of the United States Patent and Trademark Office*